3,322,660
PRODUCTION OF HYDRAZINE

William H. Johnston, Baltimore, Md., and Fred W. Lampe, State College, Pa., assignors to the United States of America as represented by the United States Atomic Energy Commission
No Drawing. Filed Feb. 18, 1963, Ser. No. 259,468
7 Claims. (Cl. 204—157.1)

This invention is related to a new and improved process for the production of hydrazine. More particularly, this invention is related to a new and improved process for the large scale production of anhydrous hydrazine having a high degree of purity.

Hydrazine has found application, until recently, only on a small scale in the laboratory due to high cost and difficulties encountered in its production. The powerful reducing character of hydrazine has made it a useful analytical reagent. It may be used to separate and precipitate certain metallic ions as the free metals and it also precipitates complex compounds of nickel, cobalt and cadmium, and can be used for the quantitative determination of these substances.

The greatest need for industrial scale production processes to produce large quantities of hydrazine in a relatively pure state is due to its potential usefulness as a jet fuel for guided missiles. It is an ideal jet and rocket fuel since complete combustion to nitrogen and water yields a mixture of products with low average molecular weight. It was mixed with methanol and water as a fuel component by the Germans in World War II.

Methods for production of hydrazine known in the prior art can be placed in three categories: (1) reduction of compounds containing a nitrogen-to-nitrogen linkage, (2) decomposition of ammonia, and (3) partial oxidation of ammonia or ammonia derivatives such as urea; hydrazine has also been obtained from ammonia by pyrolysis, photodecomposition, electron bombardment, and the action of an electrical discharge. Since its potential value as a basic raw material and fuel is dependent on discovery of an economical method of production of hydrazine, the research emphasis to develop new efficient methods of production have been directed to both photolytic and radiolytic methods of producing hydrazine directly by the irradiation of ammonia. However, problems have arisen when photlytic and radiolytic methods of production of hydrazine from ammonia have been attempted by those skilled in the art due to the fact that when ammonia is treated in such systems to produce hydrazine, there also occurs production of substantial quantities of hydrogen atoms which tend to decompose at a rapid rate any hydrazine formed in the system, thus rendering such processes commercially unworkable.

OBJECTS

An object of this invention is to provide the art with an improved method of the manufacture of hydrazine.

Another object of this invention is to provide a method of manufacturing hydrazine in large quantities with a high degree of purity.

Another object of this invention is to provide a process of manufacturing hydrazine from ammonia wherein the detrimental effects of the presence of atomic hydrogen produced in the process are greatly minimized.

Other objects will, in part, be obvious and will, in part, be shown.

We have discovered that the above objects can readily be accomplished by a process for the production of hydrazine which comprises irradiation of a mixture of gaseous ammonia and a rare gas wherein said rare gas has an ionic recombination energy of less than 15 electron volts per molecule. Exemplary of rare gases found useable in our invention are krypton, xenon, radon, and mixtures thereof. However, it must be remembered that radon is a radioactive gas and would require the use of special precautions which are well known in the art. In the preferred embodiment of our invention, we use krypton. The actual amount of rare gas present in the system can vary widely, dependent upon the percent of product yield. The presence of even slight amounts of the rare gas in our novel process will produce beneficial results. However, in the preferred embodiment of our invention, we employ an ammonia—rare gas gaseous mixture of a composition such that the ratio of the pressure produced by the rare gas in the mixture is at least 5 times the pressure produced by the ammonia in the mixture. Greater amounts of krypton can be used if so desired and any total pressure of the gas mixture consistent with equipment limitation is satisfactory. Any type of radiation can be used in our novel process provided it is an ionizing radiation having sufficient energy to ionize the rare gas. Exemplary of the type of radiation found useable in our invention are electron beams, beta rays, alpha rays, deuteron beams, proton beams, X-rays and gamma rays. The electron, proton, and deuteron beams found useable in our invention may be provided by any conventional source such as resonant transformers, Van de Graaff machines, linear accelerators, etc. Gamma rays may readily be provided by cobalt-60 sources. It is to be understood that our invention is not directed to or limited by use of any particular source of radiation but rather is directed to the use of any conventional ionizing radiation to transform gaseous ammonia in the presence of a rare gas to hydrazine and, as such, it is immaterial what type of radiation or source of radiation is used. Ionizing radiation and methods of production of such radiation are well known to those skilled in the art.

The actual amount of ionizing radiation to be employed in our process will vary widely depending on the equipment utilized and the energy of the radiation beam used. The radiation beam energy as it contacts the ammonia rare gas mixture must be greater than 14 electron volts in order to ionize the rare gas. The ionization of the rare gas and subsequent charge exchange with ammonia prevents the primary formation of hydrogen atoms in the reaction system.

Our invention can be practiced with equal facility in either a batch type or continuous flow type of operation. The practice of our process is essentially very simple and straight forward. When our process is practiced as a batch type operation, all one need do is charge a reaction vessel which has radiation means connected therewith for irradiating the contents thereof, with a gaseous mixture composed of ammonia, rare gas and if desired, a scavenging agent, irradiate the mixture and recover the hydrazine contained therein. Recovery of the hydrazine in an essentially pure state can be easily accomplished by use of conventional separation means, e.g., coolant separation means, since the hydrazine has a relatively high boiling point (113.5° C.) in comparison with the boiling point of ammonia (−30.9° C.), and in fact has the highest boiling point of any of the compounds found in the reaction vessel. The gases remaining in the vessel can be stripped of any hydrogen, acetylene (or other products derived from the scavenging agent) and any impurities remaining therein and the vessel can be recharged with ammonia and ethylene in proper proportions for reuse. The rare gas can be reused over again. With the application of conventional engineering procedures, the process can easily be converted into a continuous operation.

The temperature to be employed in our process can vary widely as we have found that it has very little effect on the production of hydrazine when our process is employed. Of course, temperatures above about 150° C. should not be used as hydrazine will decompose at temperatures above this temperature into hydrogen and nitrogen and, further, other competing reactions inherent in the system will tend to increase the amount of hydrogen atoms produced in the system.

Hydrazine is a strong reducing agent and, as such, care must be observed in the selection of materials used in equipment which is to be placed in contact with hydrazine. Glass lined or stainless steel have been found excellent for use in production of or storage of hydrazine. Care must be taken to avoid contaminants from entering the system. Spontaneous ignition of anhydrous or highly concentrated hydrazine may take place on exposure to air in contact with such porous materials as asbestos, wood, cloth and even dry earth or cinders or metal oxides. Accordingly, precautions should be taken, when our novel process is employed to produce hydrazine, to avoid having air or any other contaminants in the reaction or product storage vessels.

Since the presence of atomic hydrogen in reaction systems such as ours tends to decompose some of the hydrazine produced therein, in the preferred embodiment of our invention, we employ a hydrogen scavenging agent to remove any hydrogen atoms formed when our novel process is employed. The function of the scavenging agent is to react with and thus remove any hydrogen atoms formed in the system. Furthermore, it is extremely advantageous to employ a scavenging agent which will thoroughly intermix with the reaction mass in order to be able to react with any free hydrogen atoms contained therein. The scavenging agent selected must, of course, be effective under the reaction conditions, i.e. radiation, temperature, etc. employed in our process and it must be capable of being removed from the system. Exemplary of scavenging agents found useable in our novel process are ethylene, propylene, butadiene, trimethylethylene, tetramethylethylene chlorotrifluorethylene, isobutylene, allylchloride, allyl alcohol, allyl amine, and other unsaturatd compounds. In the preferred embodiment of our invention we employ ethylene as the scavenging agent.

The amount of scavenging agent to be employed will vary widely and is directly proportional to the amount of atomic hydrogen produced by the process. Methods for determining qualitatively and quantitatively the amounts of atomic hydrogen produced are well known to those in the art and any conventional method can be used.

U.S. Patent No. 3,020,223, J. P. Manion, Feb. 6, 1962 discloses the use of such scavenging agents in a process for producing hydrazine by subjecting gaseous ammonia to an electrical glow discharge wherein there is present a gaseous scavenging agent in the ammonia in amounts ranging from 0.05% to 5% by volume of the ammonia. The function of the scavenging agent in the process disclosed in the Manion patent is essentially similar to the function of scavenging agents found useful in our process, to wit to remove any hydrogen atoms formed during the conversion of gaseous ammonia to hydrazine. The amounts found useful in the process disclosed in the Manion patent are also useful in our process. While compounds such as ethylene tend to degrade upon irradiation to hydrogen and acetylene we have found that such decomposition in the use of such small amounts of scavenging agents under the conditions normally employed in the practice of our invention is negligible. The scavenging agent can be introduced into the reaction mass together with the mixture of ammonia and rare gas.

The following examples are given to illustrate our invention and nothing contained therein is to be construed as a limitation of the scope of our invention.

*Example I*

In this example, a gaseous mixture of krypton and anhydrous ammonia was prepared having a total pressure of 440 mm. of mercury at 20° C. in a liter flask, 40 mm. of the pressure of the mixture being produced by ammonia, the remaining pressure of mixture being produced by the krypton. The mixture was degassed three times using standard vacuum technique to remove any air contained therein. A portion of the mixture was transferred into an evacuated 25 cc. radiation cell in an amount sufficient to produce a pressure of 440 mm. of mercury in the cell. The radiation cell so filled was immersed in a bath of powdered Dry Ice and several such loadings were irradiated for periods varying from 2 to 20 minutes by means of a Van de Graaff accelerator with 2 mev. deuterons at .1 microamp beam current. After irradiation, the contents of the cells were transferred to evacuated flasks and analyzed both by gas chromatography and mass spectrometry for the amount of hydrazine produced by irradiation of the ammonia-krypton mixture. It was determined that approximately 5% per minute of the ammonia contained in the cells was converted to hydrazine. The G values (number of molecules of hydrazine that are produced for each 100 electron-volts absorbed in the system) were calculated for the hydrazine formation. Under the conditions of the experiments performed in this example a G value of 2.2 was found for the formation of hydrazine in the irradiation of the mixtures of krypton and ammonia.

*Example II*

In this example several experiments were carried out using the same procedure described in Example I except that the krypton gas used in Example I was replaced with anhydrous ammonia so that the radiation cell contained ammonia alone having a pressure of 440 mm. of mercury. It was determined that only approximately slightly less than 1% per minute of the ammonia contained in the cells was converted to hydrazine. Under the conditions of the experiments performed in this example a G value of 0.5 was found for the formation of hydrazine in the irradiation of the ammonia by itself.

*Example III*

In this example several experiments were carried out using the same procedure used in Example I except that neon gas was used in place of krypton. It was determined that only approximately slightly less than 0.4% per minute of the ammonia contained in the cells was converted to hydrazine. Under the conditions of the experiments performed in this example a G value of 0.2 was found for the formation of hydrazine in the irradiation of the mixtures of neon and ammonia.

The following chart gives a comparison of the results obtained in the examples:

| Example No. | Percent min. of Hydrazine formation | G value |
| --- | --- | --- |
| I | 5 | 2.2 |
| II | 1.1 | 0.5 |
| III | <0.4 | 0.2 |

From the above examples and disclosures it can be readily seen that our novel process provides those skilled in the art with an efficient method of manufacturing hydrazine.

Having disclosed our invention we claim:

1. A process for the manufacture of hydrazine comprising irradiating a mixture of gaseous ammonia and a rare gas with an ionizing radiation of sufficient energy to ionize said rare gas, said rare gas having an ionic recombination energy of less than 15 electron volts.

2. A process in accordance with claim 1 wherein said rare gas is a member of the group comprising krypton, xenon, radon and mixtures thereof.

3. A process in accordance with claim 1 wherein said rare gas is krypton.

4. A process in accordance with claim 1 wherein said rare gas is present in said mixture in a pressure ratio of rare gas to ammonia of 5:1.

5. A process in accordance with claim 1 wherein said radiation is a 2 Mev. deuteron radiation.

6. A process in accordance with claim 1 wherein a scavenging agent is added to said mixture.

7. A process in accordance with claim 6 wherein said scavenging agent is ethylene.

References Cited

UNITED STATES PATENTS

| | | | |
|---|---|---|---|
| 3,020,223 | 2/1962 | Manion | 204—177 |
| 3,092,561 | 6/1963 | Lampe | 204—157.1 |

OTHER REFERENCES

Gedye et al.: Proceedings Royal Soc. of London, volume A, 130 (1931), pages 346–366.

Le Roy: Canadian Chemistry and Process Industries, June 1944, page 430.

JOHN H. MACK, *Primary Examiner.*

MURRAY TILLMAN, HOWARD S. WILLIAMS,
*Examiners.*